Feb. 5, 1935.  C. FARRIS  1,989,746
RADIUS ROD FOR MOTOR VEHICLES
Filed March 29, 1932   2 Sheets-Sheet 1
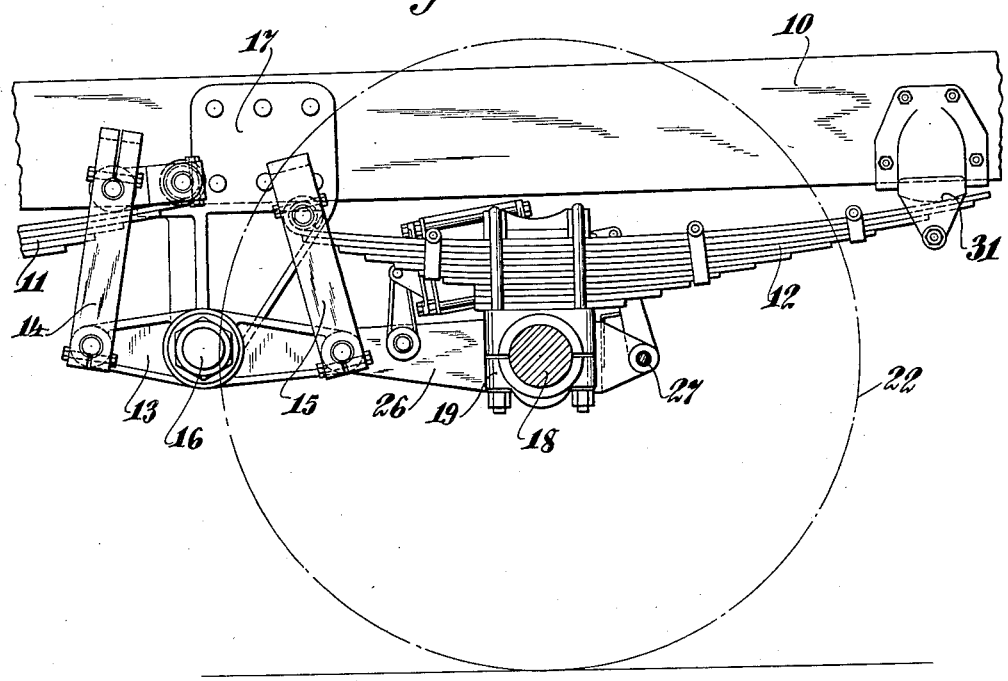
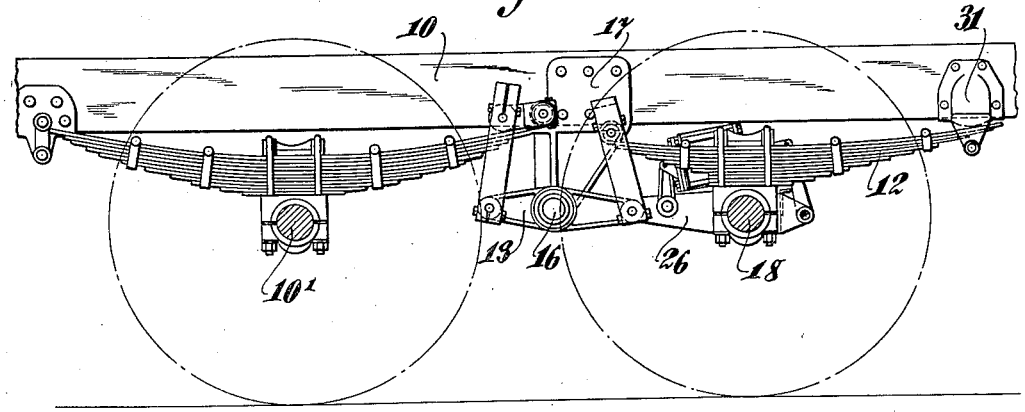
INVENTOR
Clayton Farris,
BY Redding, Greeley, O'Shea & Campbell
HIS ATTORNEYS Feb. 5, 1935. C. FARRIS 1,989,746
RADIUS ROD FOR MOTOR VEHICLES
Filed March 29, 1932 2 Sheets-Sheet 2

INVENTOR
Clayton Farris,
BY Redding, Greeley, O'Shea, + Campbell
HIS ATTORNEYS

Patented Feb. 5, 1935

1,989,746

UNITED STATES PATENT OFFICE 1,989,746

RADIUS ROD FOR MOTOR VEHICLES

Clayton Farris, Newark, N. J., assignor to The Trucktor Corporation, Newark, N. J., a corporation of Delaware Application March 29, 1932, Serial No. 601,739

1 Claim. (Cl. 280—124)

The present invention relates to radius rods for motor vehicles and embodies, more specifically, an improved radius rod and connection for six wheel vehicles having an idle axle whereby the braking reaction is transmitted directly to the vehicle frame, thus relieving the springs therefrom. It is a matter of common knowledge that the braking reactions in motor vehicle operation are quite deleterious to the springs in as much as they set up disturbing forces which not only strain the spring structure but detract considerably from the functioning of the spring during the time that such braking reactions are impressed thereon.

In constructions where a six wheel vehicle is provided with an idle axle, such axle having brake structures mounted thereon, the springs which support the axle upon the frame should function purely as load springs in order that the best riding qualities may be obtained, as well as the longest service from the spring. In order that this vehicle construction may be more effective and the operation thereof more satisfactory, the present invention has been designed to provide a construction whereby the braking reactions may be transmitted directly to the frame instead of to the spring.

In addition to the foregoing, an object of the invention is to provide a radius rod construction for motor vehicles of the six wheel type having an idle axle wherein the braking reactions are impressed directly upon the frame of the vehicle and wherein the tire slippage in turning corners is materially reduced by reason of the connection of the redius rod to the frame and the mounting of the spring thereon.

Further objects, not specifically enumerated above, will be apparent as the invention is described in greater detail in connection with the accompanying drawings, wherein:

Figure 1 is a view in side elevation, showing an axle in section and the radius rod and spring mounting construction in accordance with the present invention.

Figure 2 is a view in section, taken on line 2—2 of Figure 3, and looking in the direction of the arrows.

Figure 3:
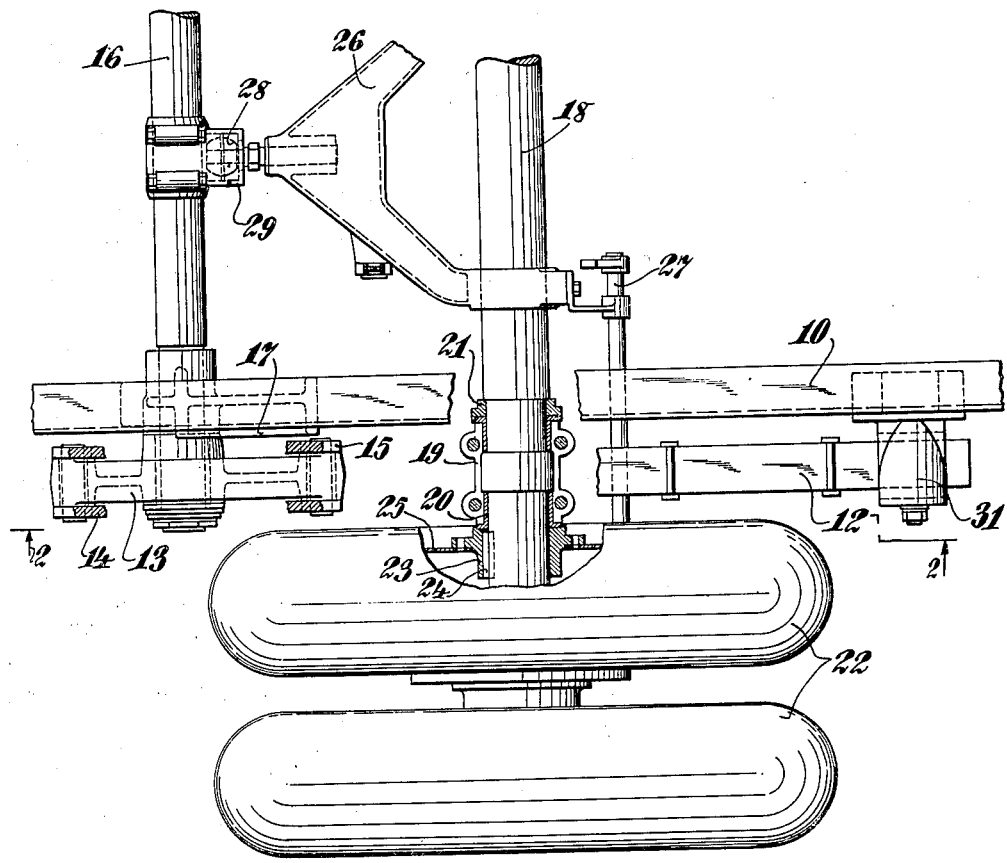
Figure 3 is a plan view partly broken away and in section, showing the radius rod construction of this invention.

With reference to the above drawings, a vehicle frame is shown at 10 upon which the main driving axle 10' is mounted. A main spring 11 is provided between the frame and the main axle. The main load spring 11 is connected to an auxiliary spring 12 through an equalizer connection comprising a bar 13 and links 14 and 15. Link 14 connects the bar 13 with the main spring 11 and link 15 connects the other end of bar 13 to auxiliary spring 12. Bar 13 is pivoted upon a cross axle 16 which may be mounted upon the frame 10 by means of brackets 17. An auxiliary axle 18 is connected to springs 12 by means of split pads 19 which are bushed at 20 to permit the springs to turn freely upon the axle. A thrust washer 21 receives the thrust of the adjacent bushing and transmits the same to the axle 18, one or more wheels 22 being journaled upon the axle.

Upon the axle 18, a brake adapter 23 is mounted, preferably being press fitted thereon and keyed thereto by means of a key 24. Secured to the adapter is the customary brake structure 25 by which the braking reaction is afforded. It will thus be seen that the braking reaction is transmitted directly to the axle 18 and any motion caused thereby is not impressed on the spring 12 by reason of the bushing and pad mounting above described.

Between the side members of frame 10 a radius rod 26 is mounted, the rod being securely fixed to axle 18 in order that no relative turning therebetween may take place. A brake operating mechanism 27 may be mounted as shown and the end of rod 26 is formed with a ball member 28 which is received within a socket 29, mounted upon cross axle 16. In this fashion, the turning of axle 18, due to braking reactions impressed thereon is impressed directly upon the cross axle 16 and spring 12 serves only as a load carrying member.

In order that a slight tracking action of axle 18 may be allowed, the rear end of springs 12 are mounted upon the frame through sleeper connections 31, thus allowing a degree of side play of the spring which, in connection with the ball joint connection 29 and 16 of the radius rod, allows the said tracking action when the vehicle turns corners, thus materially reducing the slippage of the tires.

It will thus be seen that a six wheel vehicle having two rear driving wheels and two rear idle load wheels having brake mechanisms has been provided wherein the deleterious stresses caused by the brake mechanism is transmitted directly to the frame and the auxiliary springs are thus relieved of all but direct load stresses.

While the invention has been described with specific reference to the accompanying drawings, it is not to be limited, save as defined in the appended claim.

I claim as my invention:

In combination, a vehicle frame having a driving and a towing member, the towing member including an axle to which brake mechanism is secured, springs journaled on the axle and fixed at the front ends thereof to links secured to the frame, slipper connections between the rear ends of the springs and the frame, a yoke fixedly secured to the axle in a plane of a radius of the axle and extending forwardly, an adjustable universal joint connection between the yoke and frame, the yoke extending to the center of the universal joint and the mechanism transmitting forces positively in all directions.

CLAYTON FARRIS.